Dec. 8, 1925.

W. HOEHN 1,564,351

FILTERING APPARATUS

Filed April 4, 1921     4 Sheets-Sheet 1

Inventor
WERNER HOEHN.
His Attorneys

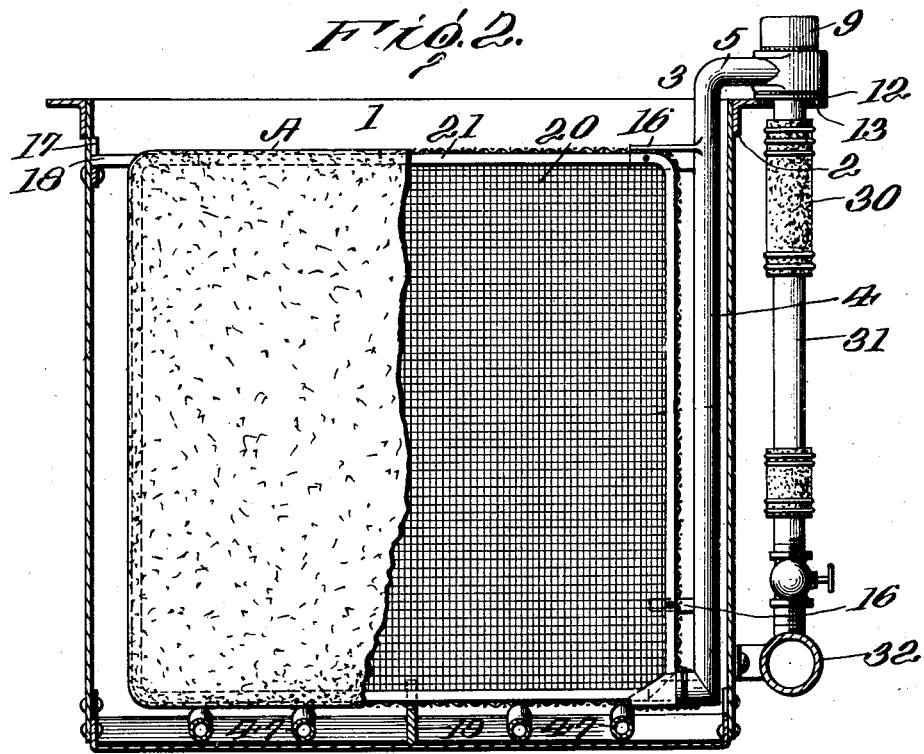
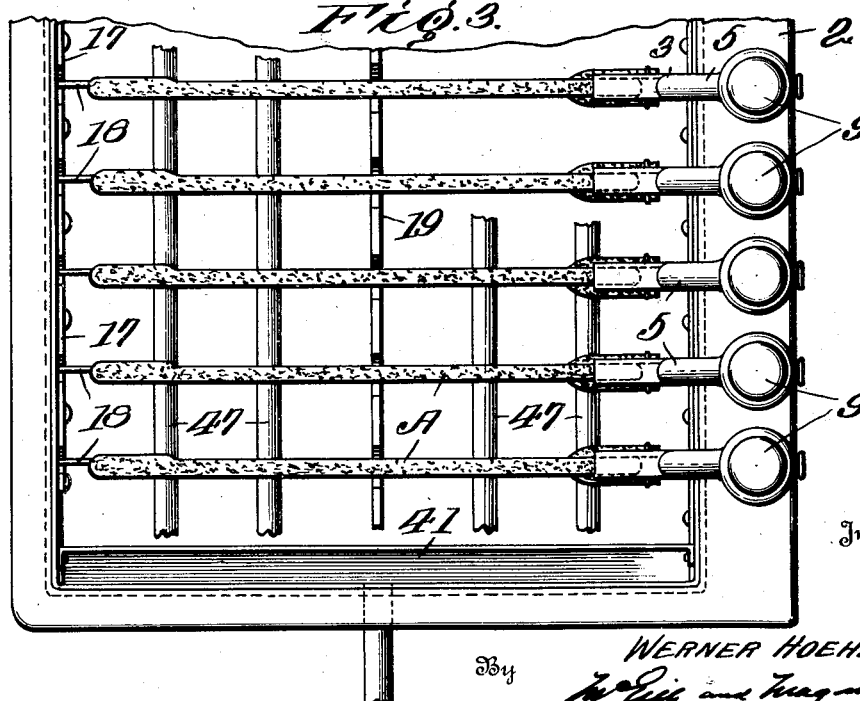

Dec. 8, 1925.

W. HOEHN

FILTERING APPARATUS

Filed April 4, 1921     4 Sheets-Sheet 3

1,564,351

Inventor
WERNER HOEHN.
By
Attorneys

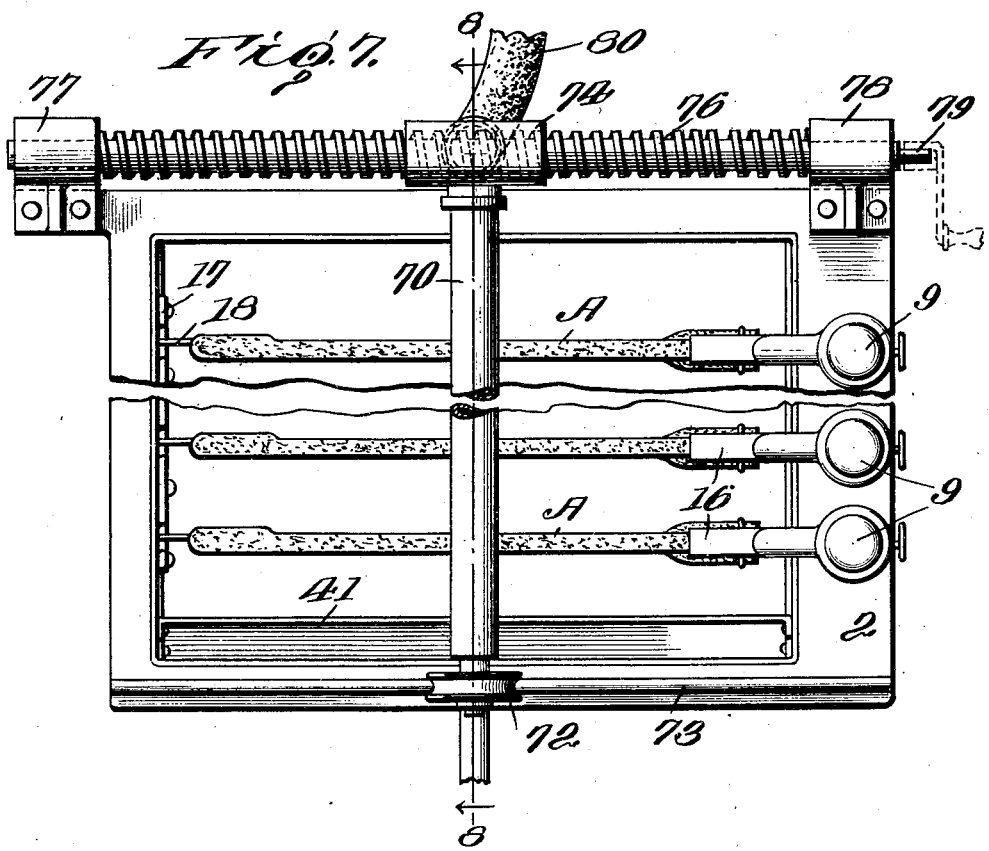
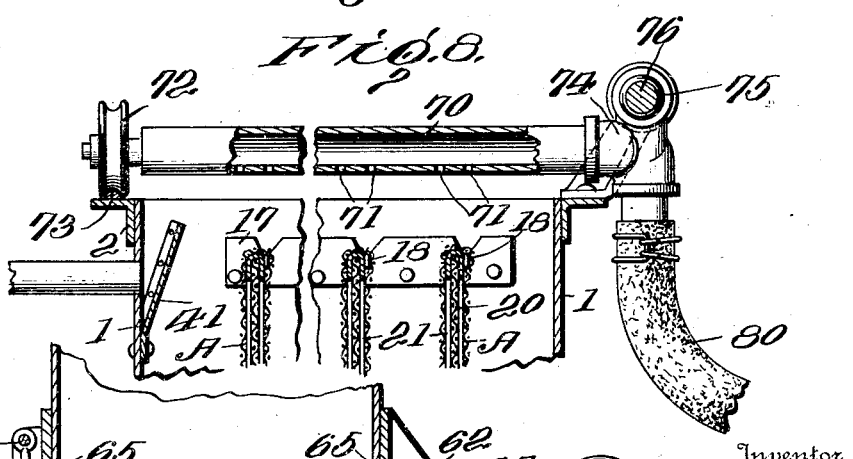

Patented Dec. 8, 1925.

1,564,351

UNITED STATES PATENT OFFICE.

WERNER HOEHN, OF NEW ORLEANS, LOUISIANA.

FILTERING APPARATUS.

Application filed April 4, 1921. Serial No. 458,227.

*To all whom it may concern:*

Be it known that I, WERNER HOEHN, of New Orleans, in the parish of Orleans and State of Louisiana, have invented certain new and useful Improvements in Filtering Apparatus; and I do hereby declare the following to be a full, clear, and exact description of the invention, such as will enable others skilled in the art to which it appertains to make and use the same.

My invention relates to apparatus for filtering fluids, especially that type of device where the solid matter is accumulated in cake form on filter leaves through which the fluid has been filtered.

The object of my invention is to provide a simple and highly efficient filter wherein the construction and operation is less costly than with heretofore known filters of this type, and a maximum filtering area is provided; wherein the cake forming on the filter leaves is always visible and the leaves may be readily and quickly cleansed in situ; wherein the filter leaves are so constructed relative to the filter as a whole as to permit the exchange of a leaf or leaves during the process of filtration, and the filter cloth or bag may be removed and turned inside out for cleansing purposes.

Figure 1:
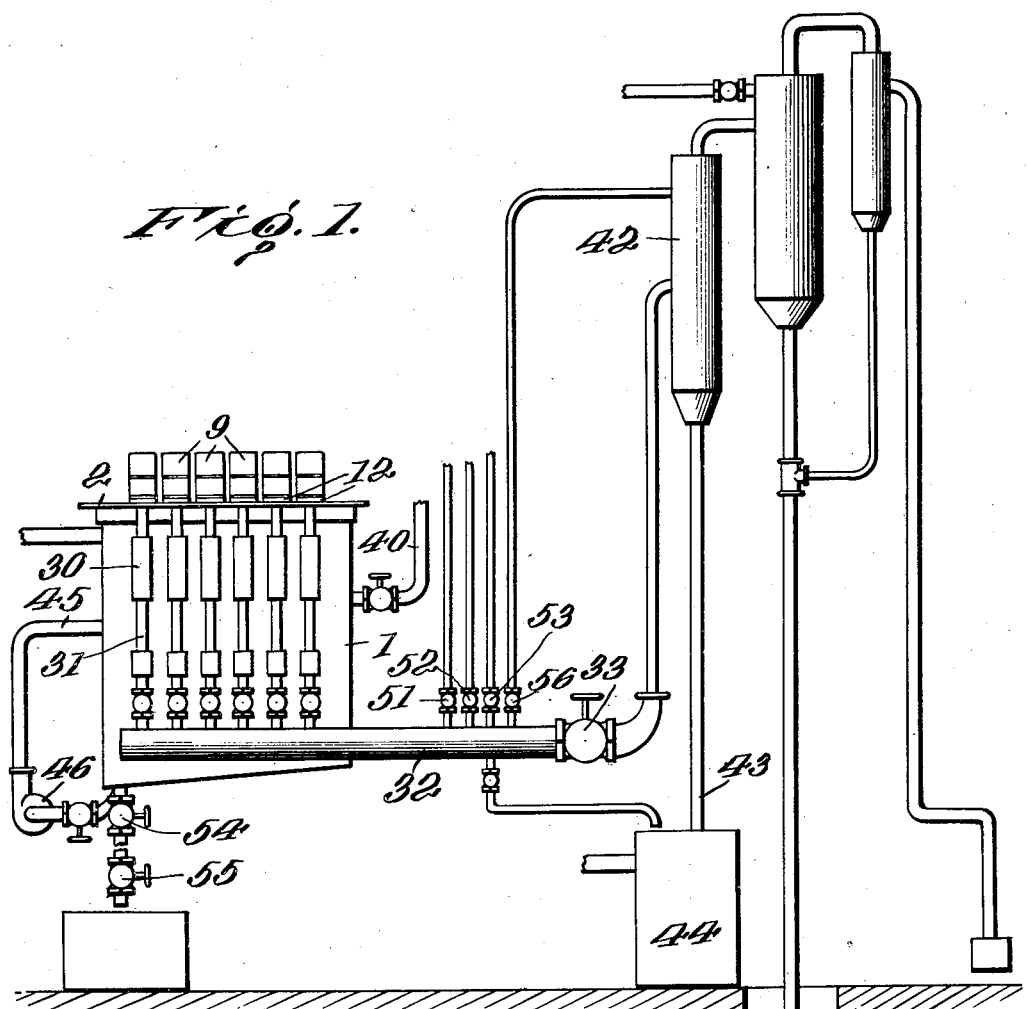
Figure 6:
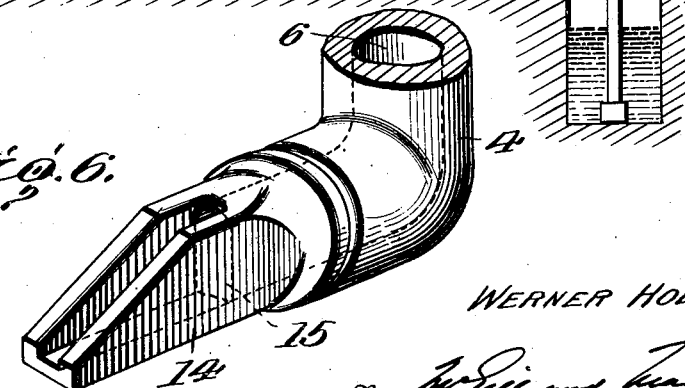
Figure 4:
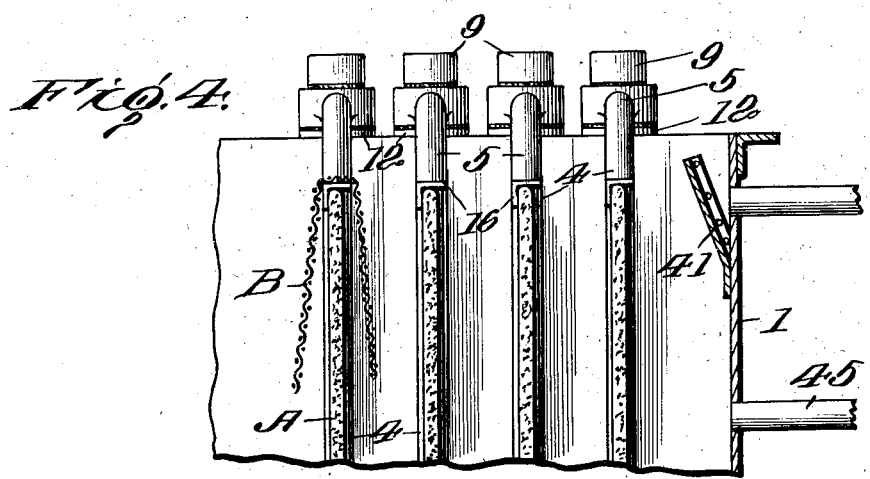
Figure 5:
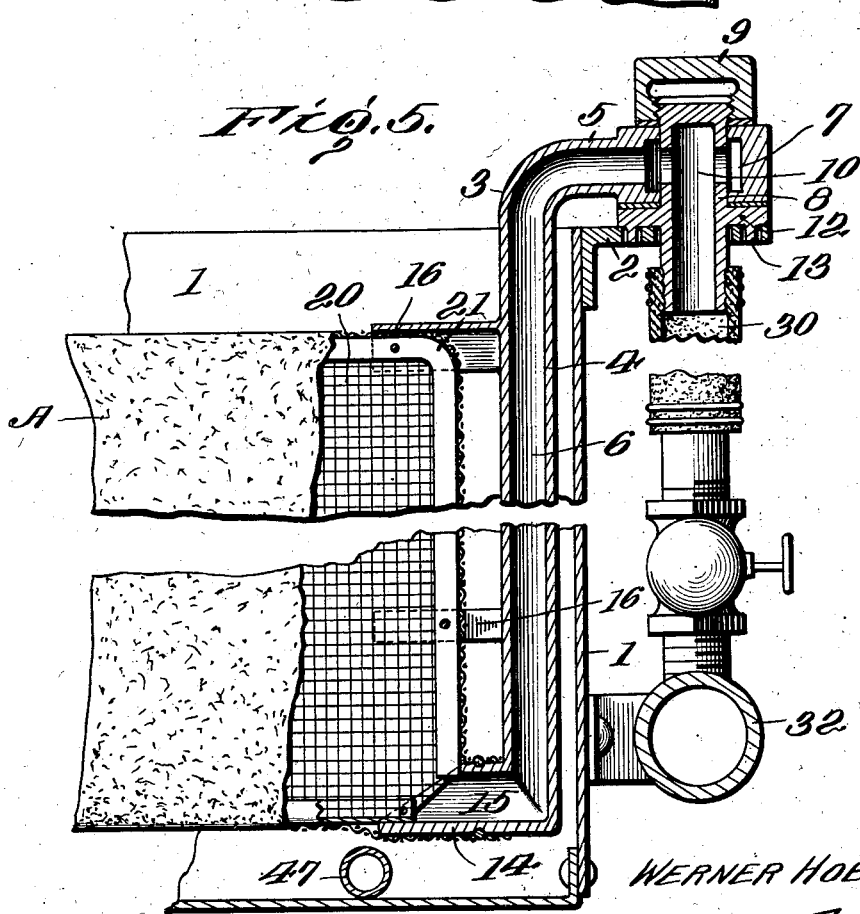

In the accompanying drawings, Figure 1 is a view in side elevation of my improved filter tank arranged in connection with a vacuum receiver. Figure 2 is an enlarged sectional view of a tank showing one of the filter leaves partly in section. Figure 3 is a top plan view of the tank shown in Figure 2. Figure 4 is a detail sectional view of a corner of the tank to show the overflow trough. Figure 5 is an enlarged view of a leaf holder and connections with a manifold. Figure 6 is an enlarged perspective of the lower portion of a leaf holder. Figure 7 is a top plan view showing a tank equipped with my improved sluicing mechanism. Figure 8 is a sectional view on line 8—8, Figure 7. Figure 9 shows a modified form of tank.

My improved filter is primarily designed for use in the filtering of sucrose liquors but may readily and successfully be used in the filtration of other fluids. In the drawings, 1 indicates an open top casing or tank at one side of which is an angle iron header 2 which forms the supporting medium for a plurality of leaf holders 3. These holders are of cast metal and each has an upright tubular portion 4 and a right angular neck portion 5 bored to communicate with the passageway 6 of the tubular portion and which bore terminates in a chamber 7 adapted to receive a nipple 8. This nipple extends through the chamber 7 and is the means by which the holder is held in fixed position on the header 2, a port 10 of the nipple forming communication between the bore of the neck 5 and a valved lead to be hereinafter described. The upper end of the nipple is closed and its extremity is screw threaded for engagement of a cap 9 which maintains the holder in position. Appropriate packing is provided to make the connections between the holder and nipple and between the holder and the header leak-proof. A flange 12 of the nipple forms the seating means therefor on the header 2 and has downwardly projecting pins or studs 13 which take in openings in the header thus steadying the nipple and preventing any turning movement in connecting the valved lead therewith. The extreme lower end of the portion 4 has a right angular projection 14 of channel form and a slot 15 forms communication with the passageway 6. 16, 16, designate two laterally projecting spaced apart brackets integral with the portion 4 and which brackets aided by the angular projection 14 form the supporting means for the filter leaf frame 20. This leaf is formed of wire mesh framed by a metal strip 21 which is bolted or otherwise secured in a leak-proof manner to the brackets 16. The filter bag indicated at A encompasses the leaf frame and a leak-proof connection is made between the lower corner of the bag and the channeled projection 14 so as to completely envelop the slotted portion of the tubular part 4 of the holder. The filter leaves are arranged in spaced relation within the tank and are steadied in position in any preferred manner. The best results are obtained by spacing the leaves in parallelism within the tank and to effect this I provide a support 17 along one side of the tank and which support has depressions in spaced arrangement to form seats for arms 18 of the filter leaves. At the bottom of the tank are guides 19 which maintain the leaves in correct position at their lower ends.

A valved lead 30 with an appropriately fitted sight glass 31 forms the communication between each holder and a pipe 32 common to all of the holders and through which the filtered liquid is withdrawn by suction. This pipe also serves as a distributing main when the filter is to be cleaned, and when so employed a master valve 33 therein shuts off communication with the suction apparatus and receiving tank.

Liquid to be filtered is preferably supplied to the tank through an opening in one side, indicated at 40. The tank is gradually filled to the level of an overflow trough 41 and when this point is reached the filtering may be effected through a vacuum created in the pipe 32.

Highly advantageous results are obtained in the use of my improved filter hereinbefore described by a process which includes the feeding of the liquid to be filtered into the tank 1 through supply opening 40, the tank being gradually filled to the level of the trough 41. When the liquid reaches this point the master valve 33 is opened thus connecting the pipe 32 with a vacuum receiver, indicated in Figure 1 at 42, and which vacuum receiver is sealed against the atmosphere by a leg-pipe 43 one end of which is submerged in clear filtered liquid within a tank 44. Air contained in the pipe 32 will instantly rush into the vacuum receiver 42 and a vacuum will be created in the pipe 32 and consequently the liquid contained in the filtering tank will be drawn through the filter bag and into the passageway 6 of each holder through its slot 15. It will be apparent that because the exit opening or slotted end of the holder is wholly within the bag no unfiltered liquid can be drawn into the holder and that all sludge will accumulate on the filter leaves, the filtering process being kept up until the bags become clogged with impurities forming so-called sludge cakes. To prevent an accumulation of solids on the bottom of the tank as frequently occurs when a filter-cell or any other filter media or decolorizing carbons are used, I may insure constant circulation of the liquid to be filtered by means of a pipe line 45 leading from the bottom of the tank to the upper portion thereof, a pump 46 being the lifting means. It is also frequently desirable, in the process of filtering certain liquids to keep them in a heated state, and this I accomplish by providing heat coils 47 on the bottom of the tank which are suitably connected with a source of supply.

In the filtration of liquids which give off great quantities of slime and thus tend to clog the filter bag A, I find that much time may be saved and a greater quantity of liquid filtered in a cycle of operation by using an auxiliary filter cloth B which may be quickly hung over the filter frame and on which the slime will gather, and which may as quickly be removed after thoroughly caked, thus leaving the filter bag A in a cleaner condition.

In Figure 9 I have shown a modified form of tank, the bottom 60 thereof being downwardly inclined to a single draining exit 61. The bottom is hinged to one side of the tank as at 62 and secured at the opposite side in any preferred manner, as by hinged bolts 63. A weighted arm 64 counterbalances the weight of the bottom in the opening and closing movements. Gaskets 65 are secured around the abutting portions of the tank and bottom to make the connection leak-proof. This form of tank is of advantage where it is desired to drain the tank and to discharge the sludge cake in a dry state, such discharge being readily and quickly effected without exposing any portion of the filter leaves.

Cleansing of the filter may be accomplished in several ways, namely, during the process of filtration by sluicing; by stopping filtration and the use of air, water and steam; and by removing one or more of the filter leaf holders at a time and without interrupting the filtering operation and scrubbing the filter bag or replacing it with a new one. If the nature of the liquid being filtered is such that it is permissible to dilute the same the liquid supply to the tank through the opening 40 is cut off and as soon as the liquid level in the tank gets lower the exposed surfaces of the leaves are washed with water by means of a sluicing pipe 70, to be hereinafter described. If it is not permissible to dilute the fluid then the sluicing may be accomplished by using the filtered fluid under pressure from a convenient source of supply. Sluicing under these circumstances may be carried on as long as the liquid level in the tank seals the slotted opening 15 of the leaf holder. When this latter level is reached a fresh supply of liquid is introduced into the tank through the pipe 40.

When it is desired to clean the filter by stopping the filtering operation the supply is cut off and the contents of the tank filtered to the lowest possible level. Thereupon the leaves are drained by air through a valved connection 51 with the pipe 32, the valve 33 of this pipe having been previously closed. After this draining is accomplished valve 51 is closed and steam is introduced into the pipe 32 through valve 52 the bags being thus thoroughly steamed. Thereafter valve 52 is closed and hot water is supplied to the bags through a valve connection 53. After these steps have been carried on in the order named and the hot water shut off, the leaves are washed on the outside by sluicing through the pipe 70. The accumulated washwater and unfiltered liquid is drained off through valve 54 and the slush cake is withdrawn through valve 55, both arranged at the lower end of the inclined bottom of the tank. Filtering may now be resumed, and I find that better results are to be had in establishing the vacuum in pipe 32 through a small vacuum pipe 56 which is then promptly closed and the main valve 33 opened.

It is apparent that by my improved construction of filter leaf holder a single holder may be removed from the tank for cleaning purposes without interfering with the operation of the filtering process. This is accomplished by first closing the valve in the lead 30 and then unscrewing the cap 9, the holder being then released from connection with the nipple and free to be lifted from the tank and then the leaf may be disconnected from the holder for any purpose.

The sluicing mechanism with which the tank is equipped includes a pipe 70 extending across the tank transversely of the leaves, the pipe having a series of perforations 71 so arranged that wash water or other substance used in sluicing may be discharged downwardly so as to clean each side of each leaf. At its outer end the sluicing pipe is provided with a supporting roller 72 which engages and is supported by a track 73 suitably mounted on the tank frame. At its opposite end the pipe 70 is supported by a casting 74 through which extends a screw threaded opening 75 for engagement with a threaded shaft 76, this shaft being journaled at its ends in supports 77, 78. At 79 the shaft is shown provided with a handle by which it may be rotated to effect travel of the pipe 70 lengthwise of the tank so as to appropriately discharge the sluicing liquid along each side of the leaves. 80 indicates a flexible connection between the casting 74 and an appropriate source of supply of suitable sluicing media. Instead of providing a threaded connection between the shaft 76 and the casting 74, the bore of the latter may be smooth and the shaft similarly formed so that the pipe may be moved back and forth along the length of the tank by engagement with a handle appropriately secured to the casting. It will be apparent that the sluicing mechanism which I have described is simple in arrangement and not costly of construction. It is further to be understood that this form of sluicing means may be used for the purpose of carrying wash water or if desired of supplying filtered liquid for the purpose of washing down the leaves, the flexible connection 80 being capable of connection with any preferred source of supply.

I claim as my invention:

1. A filtering apparatus including a tank, a series of filter leaves within said tank, a holder for each leaf extending along one side of the tank and forming a support for the filter leaves and having communication therewith, said holders removably supported on the tank the arrangement of the parts being such that a filter leaf and holder may be removed from the tank without interrupting the operation of the apparatus, a manifold, and valve controlled means for independently connecting each of the holders to the manifold.

2. A filtering apparatus including a tank, filter leaves within the tank, and holders mounted on the tank and extending along one side thereof, each of said holders being provided with a channel at one end for the reception of a filter leaf and forming a support therefor, and having a passage therethrough forming a communication with the filter leaves.

3. Filtering apparatus including a tank, a series of filter leaves within said tank, a holder for each leaf, said holder comprising an upright tubular portion adapted to lie within said tank and slotted at its lower end, lateral projecting brackets on said tubular portion to which a filter leaf is secured, the upper end of said holder having an opening therethrough in communication with its bore, a header at one side of said tank, nipples carried by said header and projecting through the openings in the upper end of said holders to support the holders on said header, a manifold common to all the holders, communication being established between such holders and manifold through said nipples.

4. Filtering apparatus including a tank, a series of filter leaves within said tank composed of wire mesh with a fabric covering, a holder for each leaf, said holder comprising an upright tubular portion adapted to lie within said tank and slotted at its lower end, the fabric covering of said filter leaf enveloping the lower slotted end, lateral projecting brackets on said tubular portion to which a filter leaf is secured, the upper end of said holder having an opening therethrough in communication with its bore, a header at one side of said tank, nipples carried by said header and projecting through the openings in the upper end of said holders to support the holders on said header, a manifold common to all the holders, communication being established between such holders and manifold through said nipples.

In testimony whereof I have signed this specification.

WERNER HOEHN.